(12) United States Patent
Kobres et al.

(10) Patent No.: US 10,354,054 B2
(45) Date of Patent: Jul. 16, 2019

(54) METHODS AND A SYSTEM FOR PASSIVE AUTHENTICATION

(71) Applicants: Erick Kobres, Lawrenceville, GA (US); Stavros Antonakakis, Lake Mary, FL (US); Ravi Prakash Mishra, Secunderabad (IN); Suman Kumar Bhowmick, Hyderabad (IN); Ajay Gordhandas Mulani, Sion (East) (IN)

(72) Inventors: Erick Kobres, Lawrenceville, GA (US); Stavros Antonakakis, Lake Mary, FL (US); Ravi Prakash Mishra, Secunderabad (IN); Suman Kumar Bhowmick, Hyderabad (IN); Ajay Gordhandas Mulani, Sion (East) (IN)

(73) Assignee: NCR Corporation, Atlanta, GA (US)

( * ) Notice: Subject to any disclaimer, the term of this patent is extended or adjusted under 35 U.S.C. 154(b) by 467 days.

(21) Appl. No.: 14/633,731

(22) Filed: Feb. 27, 2015

(65) Prior Publication Data
US 2016/0063471 A1  Mar. 3, 2016

Related U.S. Application Data

(60) Provisional application No. 62/043,025, filed on Aug. 28, 2014.

(51) Int. Cl.
*H04L 29/06* (2006.01)
*G06F 21/31* (2013.01)
(Continued)

(52) U.S. Cl.
CPC ....... *G06F 21/316* (2013.01); *G06K 9/00288* (2013.01); *G06Q 20/20* (2013.01); *G06Q 20/206* (2013.01); *G06Q 20/208* (2013.01); *G06Q 20/40* (2013.01); *G06Q 20/401* (2013.01); *G06Q 20/4016* (2013.01); *G06Q 20/40145* (2013.01); *G10L 17/005* (2013.01); *H04L 63/08* (2013.01); *H04L 63/0853* (2013.01);
(Continued)

(58) Field of Classification Search
CPC ........ G06F 21/30; G06F 21/31; G06F 21/316; G06F 21/32; G06F 21/34; G06F 21/35; G06F 21/40; G06F 21/50; G06F 2221/2139; H04W 12/06; H04L 63/08; H04L 63/0853; H04L 63/102; G06Q 20/20; G06Q 20/206; G06Q 20/40; G06Q 20/401; G06Q 20/4014; G06Q 20/40145; G06Q 20/4016; G06K 9/00228; G06K 9/00288
See application file for complete search history.

(56) References Cited

U.S. PATENT DOCUMENTS 5,450,319 A * 9/1995 Ishikawa .............. G06Q 20/206
340/5.41
6,334,121 B1 * 12/2001 Primeaux .............. G06F 21/552
706/52

(Continued)

*Primary Examiner* — Eric W Shepperd
(74) *Attorney, Agent, or Firm* — Schwegan, Lundberg & Woessner

(57) ABSTRACT

Resource attributes for resources are continuously and regularly collected from hardware and software resources of one or more devices. The resource attributes are continuously fed to one or more confidence calculators. At any given point in time, a single confidence value is provided to an authentication for making a decision as to whether to authenticate a user for access to a particular resource.

11 Claims, 9 Drawing Sheets

(51) Int. Cl.
  *G06Q 20/20* (2012.01)
  *G06Q 20/40* (2012.01)
  *G06K 9/00* (2006.01)
  *G10L 17/00* (2013.01)
  *H04W 12/06* (2009.01)
  *H04L 29/08* (2006.01)

(52) U.S. Cl.
  CPC ........... *H04L 63/102* (2013.01); *H04W 12/06* (2013.01); *G06F 2221/2111* (2013.01); *H04L 67/12* (2013.01)

(56) References Cited

U.S. PATENT DOCUMENTS

| | | | |
|---|---|---|---|
| 6,554,705 B1* | 4/2003 | Cumbers | G06K 9/00597 463/29 |
| 6,898,299 B1* | 5/2005 | Brooks | G06K 9/00 340/5.52 |
| 7,684,556 B1* | 3/2010 | Jaiswal | H04M 3/5166 379/266.01 |
| 8,554,689 B2* | 10/2013 | Mardikar | G06Q 20/1085 705/64 |
| 9,189,788 B1* | 11/2015 | Robinson | G06Q 20/40145 |
| 9,569,605 B1* | 2/2017 | Schneider | G06F 21/32 |
| 2003/0046096 A1* | 3/2003 | Shah | G06Q 30/02 705/1.1 |
| 2003/0163710 A1* | 8/2003 | Ortiz | H04L 63/0861 713/186 |
| 2004/0019570 A1* | 1/2004 | Bolle | G06F 21/32 705/64 |
| 2007/0206839 A1* | 9/2007 | Hanna | G06K 9/00885 382/115 |
| 2008/0046366 A1* | 2/2008 | Bemmel | G06Q 20/20 705/44 |
| 2010/0079250 A1* | 4/2010 | Fukushima | G06F 21/35 340/10.1 |
| 2011/0238510 A1* | 9/2011 | Rowen | G06K 9/00187 705/16 |
| 2013/0051632 A1* | 2/2013 | Tsai | G06K 9/00892 382/118 |
| 2013/0207786 A1* | 8/2013 | Hutzler | G06K 9/00892 340/10.51 |
| 2014/0093140 A1* | 4/2014 | Juveneton | G06K 9/00906 382/117 |
| 2014/0337634 A1* | 11/2014 | Starner | H04L 9/3231 713/186 |
| 2014/0337945 A1* | 11/2014 | Jia | H04L 63/0876 726/6 |
| 2014/0347479 A1* | 11/2014 | Givon | G06K 9/00342 348/143 |
| 2014/0380445 A1* | 12/2014 | Tunnell | G06F 21/00 726/7 |
| 2015/0028996 A1* | 1/2015 | Agrafioti | G06F 21/40 340/5.82 |
| 2015/0089568 A1* | 3/2015 | Sprague | H04L 63/0876 726/1 |
| 2015/0310444 A1* | 10/2015 | Chen | G06Q 20/4016 705/44 |
| 2016/0055324 A1* | 2/2016 | Agarwal | G06F 21/31 726/17 |
| 2016/0098121 A1* | 4/2016 | Sirpal | G06F 1/1616 715/773 |
| 2017/0109754 A1* | 4/2017 | Hanna | G06Q 20/4016 |
| 2017/0195703 A1* | 7/2017 | Durbha | H04N 21/25816 |
| 2017/0199588 A1* | 7/2017 | Ahn | G06F 3/0346 |

* cited by examiner

METHODS AND A SYSTEM FOR PASSIVE AUTHENTICATION

RELATED APPLICATIONS

The present application claims priority to, and is a non-provisional filing of Provisional Patent Application Ser. No. 62/043,025 entitled: "Passive Authentication and Authentication Confidence Calculator," filed on Aug. 28, 2014, the disclosure of which is incorporated in its entirety herein and below.

BACKGROUND

Electronic authentication is commonplace in today's highly-connected society, especially in view of the fact that more and more individuals are conducting financial and personal transaction electronically.

Authentication can come in a variety of forms, such as single-factor authentication and multifactor authentication. Authentication can be done with different degrees of perceived strength. For example, biometric authentication is typically believed to be a stronger form of authentication than an identifier and password combination.

Some authentication requires a user to possess something (such as a token or a magnetic card) and to know something (such as a password or key value). Generally, authentication requires some action on the part of the individual being authenticated, such as having finger scanned, entering a card and Personal Identification Number (PIN), providing a token or certificate with a key, and the like.

Most authentication techniques are binary in nature, which means the authentication technique authenticates an entity or fails to authenticate the entity. Authentication is typically associated with individuals being authenticated but in fact, hardware resources and software resources are also subject to authentication in computer systems.

However, if authentication is wanted not for necessarily performing a secure transaction, accessing a secure system, or verifying a secure asset but, rather authentication is wanted for deciding whether there is a measurable degree of confidence that someone can be identified without any affirmative knowledge or action on the part of that someone, then very little exists in the industry for this type of authentication. But, such a technique can provide a variety of beneficial opportunities for enterprises for purposes of: marketing, customer service, Customer Relationship Management (CRM), security within an enterprise, security of an individual's personal device, security within law and government agencies, and the like.

Therefore, there is a need for improved authentication mechanisms.

SUMMARY

In various embodiments, methods and a system for passive authentication are presented.

According to an embodiment, a method for passive authentication is presented. Specifically, resource attributes associated with a resource are obtained. Next, a determination is made, at given point in time, as to whether a user is to be passively authenticated for access to a second resource based on the resource attributes.

DETAILED DESCRIPTION

Figure 1A:
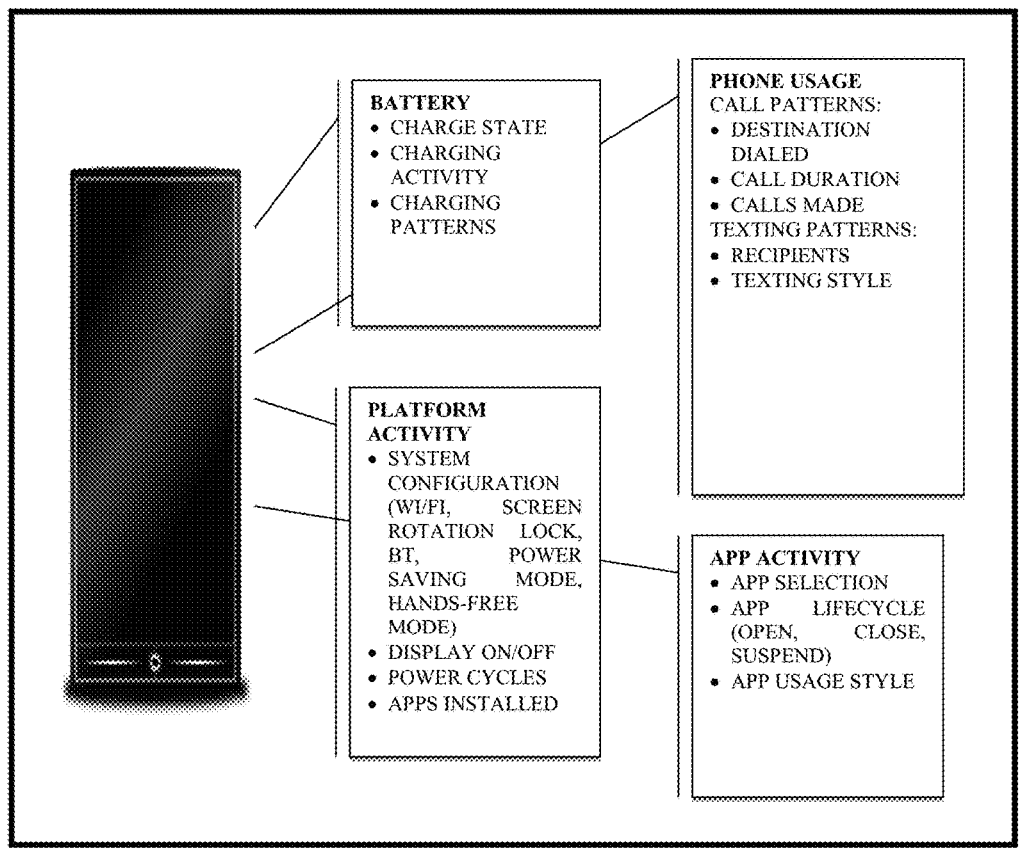
FIG. 1A is a diagram of component information collected for a mobile device and use in passive authentication, according to an example embodiment.

As used herein term "confidence" and the phrase "confidence value" may be used interchangeably and synonymously. The term and phrase refer to a computed scalar value provided through the various mechanisms and inputs to those mechanisms discussed herein and below. The scalar value is relevant to determining whether a user and/or a device associated with that user is to be authenticated. That is, the scalar value when compared to a predetermined value may provide authentication of a user and/or of a device.

The authentication performed is "passive," which means that the user does not have to affirmatively provide (through a manual input mechanism) any credential to achieve authentication; rather, the confidence associated with ongoing and continuous authentication of the user and/or device occurs through regularly computing, in an unobtrusive and transparent manner from the perspective of the user, the authentication confidence (scalar value), which is then compared with a predetermined value to determine whether authentication was achievable or not achievable.

It is noted that based on the comparison between any computed confidence and any predetermined value; authentication does not have to be a binary exercise. That is, a user may be granted different levels of access (to resources of a device) based on a computed difference between the confidence value (at any given point in time) and a predetermined value. For example, when the different between the computed confidence and a predetermined value is within a predefined range, then the user is granted access to limited resources and not all available resources on a device. This is but one example; the point is that confidence with respect to user/device authentication can result in: a failed authentication having no access to any resources, a successful authentication having access to all resources, or a limited authentication having varying levels of access to some resources.

A "confidence calculator" is one or more software modules implemented as executable instructions within a memory of a device and/or on a non-transitory computer-readable storage medium of the device. The executable instructions execute on one or more processors of the device.

The confidence calculator can be executed in multiple different processing environments and on multiple different devices as a particular "instance" of the confidence calculator. Multiple instances of the confidence calculator may cooperate with one another to produce a single confidence value. In some cases, multiple instances of the confidence calculator may be chained together, such that output from one instance becomes one input value to a next instance in the chain of confidence calculators.

A "resource" can include: a hardware asset of a device (e.g., processor, peripheral, communication port, etc.) and/or a software asset of a device (e.g., an application program, an automated electronic service, an electronic system, a file, etc.). A resource can also include a grouping of other resources, such as a processing environment/platform, a directory, and/or composite device.

As used herein "resource attributes" are measurable metrics obtained for a resource, such as but not limited to: a resource identifier, a resource state, a resource load (utilization), resource activity identifiers, resource operation identifiers, a resource configuration, and the like. The resource attributes are captured through sensors integrated into devices and/or captured through software modules (such as Operating System (OS), tracking modules, etc.) that process on devices.

Some embodiments herein, describe technique by which a device's resources (OS, platform applications and/or user application) events are fed into confidence component calculators where they are used in conjunction with other sensory and radio inputs to produce confidence component values. This continuous stream of events and usage activity provided to confidence component calculators then produces a continuous overall confidence value (since scalar confidence value), which provides the device or a different device with a level of certainty that the expected owner/operator of the device is currently in possession of that device.

In an embodiment, a continuous stream of OS activity obtained from a mobile device, user application activity and mobile device phone usage are fed to component confidence calculators. Next, the accumulated information is correlated against a reference of common activity for the purposes of determining how confident (via the single scale confidence authentication value) it is that the person using the mobile device is also the owner/operator of the phone. This processing occurs in a continuous and non-intrusive manner as multi-input passive authentication process.

FIG. 1A is a diagram of component information collected for a mobile device and use in passive authentication, according to an example embodiment. It is to be noted that the components are shown schematically in greatly simplified form, with only those components relevant to understanding of various embodiments being illustrated.

There are multiple types of resource activity streams (resource attributes) that can be input into component confidence calculators: OS, platform and application events. The FIG. 1A provides a non-exhaustive list of events (resource attribute information) that can be accumulated over time and used as component confidence calculator input sources:

For example, in within the context of the FIG. 1A consider the following actions and resource attributes gathered and processed for passive authentication:

A user successfully unlocks his device. Overall confidence in the authenticated user increases as soon as this event (resource attribute) is detected.

The OS lifecycle application events are input into confidence component calculators. The events recorded include: the start, stop, suspension, screen rotation and other application specific events at the time of occurrence. These events are fed as input into a component confidence calculator where they're stored and a frequency graph is built against these events. With the graph, all current application events can be evaluated for their expected value and a confidence value component based on whether normal behavior is being exhibited.

The platform's keyboard key press events & timestamps (other types of resource attributes) are captured and used to build a model that characterizes the user's typing method. Words used, errors made, typing speed & cadence, etc. As more data is compiled, the current keying events are correlated against the historical model that's continuously refined calculating an authenticity confidence value component (single scalar value).

The OS battery charge & discharge cycle events are read and input into a component confidence calculator. These battery events are stored with a time stamp and over time common charging patterns can emerge. The assumption is that device owners habitually charge their phones for a given period of time: on their way to work and back, at the office, at home on the kitchen counter, etc. Modeling these and even pairing them with device location data produces frequency graphs to assist with calculating component confidence values based on whether the current charging behavior is fairly normal when compared against the historical model.

Phone configuration options can also be used as an input to component confidence calculators. Although mostly static, some will be changed periodically and vary depending on the owner's habits. Even if some settings do not change is also an identifying attribute for a confidence value calculation. Here are some of the configuration items processed by sampling their current values as well as when the values change.

The display idle-time out setting

Keyboard type: conventional, Swype®, split screen

Screen rotation (landscape/portrait) and whether or not it's locked

Is Bluetooth® enabled and what devices are paired

Is Wi-Fi enabled, what Wi-Fi networks are saved, is auto-connect enabled?

Volume level

Power saving mode (on/off)

Hands-free mode (on/off)

Allow installation of apps from outside the default App store (not applicable to Apple iOS®)

Apps (applications) & user app (application) activity events are collected by component confidence calculators, stored and organized for analysis to model/characterize the user's app usage behavior and compare against current app usage for deriving a component confidence value that the current user is the owner/operator of the device. Characteristics that are recorded include: the installed apps themselves (i.e. social media apps, such as: Facebook®, LinkedIn®, Twitter®, etc.), the times the applications are started, the length of time they are used before closed or suspended, etc. How the apps are managed is also a collected indicator; for example, does the user periodically flush the suspended apps to free up memory or will all the apps eventually be suspended in the background. Some platforms allow the installation of unsigned applications.

Telephony events are also good input data into component confidence calculators for comparing against common usage. These include: telephone numbers dialed, incoming calls received, length of telephone calls, texting frequency, length of texts, syntax used for texting, etc. These events are input into component confidence calculators, accumulated and analyzed to generate a model of normal usage, with which streams of new telephony events are compared against to evaluate the component confidence value.

Figure 1B:
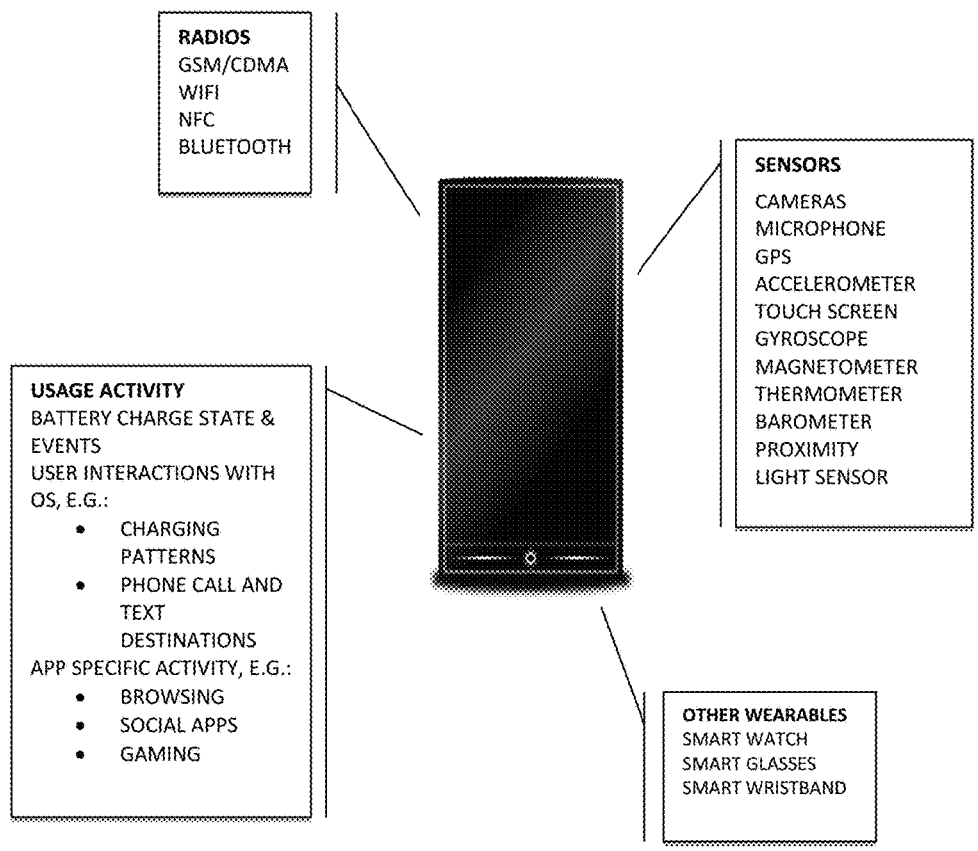
FIG. 1B is a diagram of sensors and component formation collected for a mobile device and use in passive authentication, according to an example embodiment.

FIG. 1B is a diagram of sensors and component formation collected for a mobile device and use in passive authentication, according to an example embodiment. Again, the FIG. 1B is shown in greatly simplified form with just those components necessary to understanding various embodiments being presented.

The techniques presented herein provide a novel mechanism replacing these manual, one-time conventional manual authentication mechanisms based on something the user knows and something the user is, with a continuous passive authentication system that takes advantage of a mobile or wearable device's multiple streams of continuous input source data (as resource attributes from sensors). These streams of data are analyzed to generate confidence components and these confidence components are aggregated with a weighting formula generating a scalar value (single scalar confidence value) representing the level of confidence that the device is currently in the possession of the expected owner.

Moreover, modern mobile and wearable devices are equipped with an ever increasing number of sensors empowering these devices to better recognize and interact with their surroundings. Similarly, there is a large volume of user interaction activity that can be captured as an additional input source.

Some example sensors and sensor collected data (resource attributes) include:

GPS: The mobile device uses GPS data to track a user's location. The sensor data is sent to confidence calculator that is responsible for: recording the location along with a time stamp, building a history of user movement over time, etc. As data is accumulated, a multi-dimensional frequency graph that includes GPS positions and time stamps is built that can be used to correlate a current user location at a specific time against that user's historical data. The confidence calculator also calculates a confidence scalar value based on whether the user is traveling to expected or unexpected locations at an expected time.

Accelerometer & gyroscope for gait: The mobile device uses its accelerometer and gyroscope to construct a model of the user's motion while walking or running (gait), exercising, sitting, standing, or other everyday movement. These sensors can also detect when the mobile device is physically on the person and when it's not. The accelerometer samples acceleration forces which when coupled with a gyroscope's orientation sensors allows for the modeling of fairly detailed motion, which the confidence calculators can then map to known and learned movement types. As the confidence calculators assist in building a history of this data, a confidence scalar value based on the expected behavior of the user can be resolved at any given point in time. In an embodiment, training processing is used by having the user manually tag start/end times for specific events. For example, before a run, the user might let the mobile device know he is about to run and then mark the end of the run once the exercise stops. Similar user hints can be dropped for other types of activities such as walking, speed-walking, various sports, etc.

Accelerometer & gyroscope for arm motion: The mobile device uses its accelerometer and gyroscope to construct a model of the motion path a user takes to bring the device to their ear (for a call) or in front of them (for reading or use of speaker phone) and the angle at which it is held while in use. The OS of the mobile device can provide hints of these activities starting/ending, such as when there's an incoming call or text, or when the user is actively reading/typing and then feeding those hints along with the sensor data, models of the movement are saved over time, which are then used for correlating a current motion to generate a confidence match.

The touch screen: The processing of the mobile device analyzes the characteristics of the user's use of the touch screen including pressure applied and finger movement (speed, acceleration, etc.) to continuously authenticate the user. The confidence calculator stores this tactile information to refine the models for continuous detection improvements over time as current activity is correlated against historical data.

The front-facing camera: The mobile device uses the front facing camera to detect a person's face is in view, and will take a picture. Using the front-facing camera greatly increases the frequency of opportunities since the user will usually be in view when using his phone. Pictures (images) that are captured are stored in a database and facial recognition analysis is run against a set of known quantities to supply the confidence scalar value. In an embodiment, a setup period is used in which a number of head shots are taken of the owner of the phone under different lighting conditions to establish a baseline for comparison. In an embodiment, in order to mitigate concerns against privacy, the techniques can ensure any such facial recognition approach is clearly explained to the user along with an explicit opt-in action required by the owner of the mobile device and also performing the image processing on the device can appease some consumers. In an embodiment, server-based processing for the facial recognition is used to take advantage of more secure and more powerful processing systems.

The Microphone: The mobile device listens for the ambient sound of the user's voice using traditional voice tone pattern recognition tactics as an additional confidence factor. The data is fed into a confidence calculator where services can be used to extract key metadata and store it over time. On device and off-device noise reduction and primary audio enhancement digital signal processing algorithms are used to refine the sound and reduce error rates. In an embodiment, a setup or learning period takes place where the processing asks the operator to read passages aloud to record a baseline of the expected voice; however, it is to be noted that this is not a requirement.

Figure 1C:
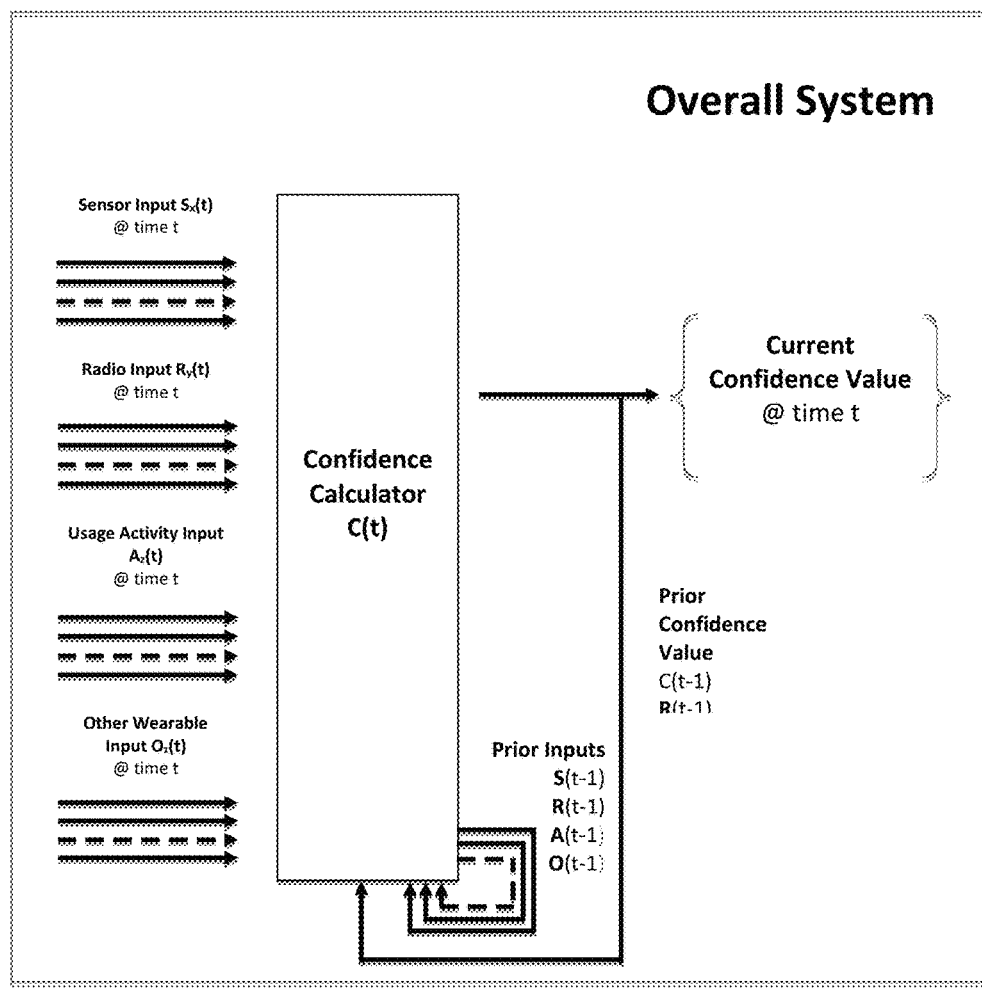
FIG. 1C is a diagram depicting input data streams to a passive authentication system, according to an example embodiment.

FIG. 1C is a diagram depicting input data streams to a passive authentication system, according to an example embodiment. Again, the FIG. 1C is shown in greatly simplified form with just those components necessary for understanding various embodiments being presented.

The confidence calculation mechanism is provided current input streams as well as historical input and previous confidence values. All these inputs and feedback are used to generate the current confidence value at a point in time. The confidence calculation process may also be a distributed system of multiple components residing both on the mobile device and off-device (e.g. in a cloud service, a POS terminal, etc.).

Figure 1D:
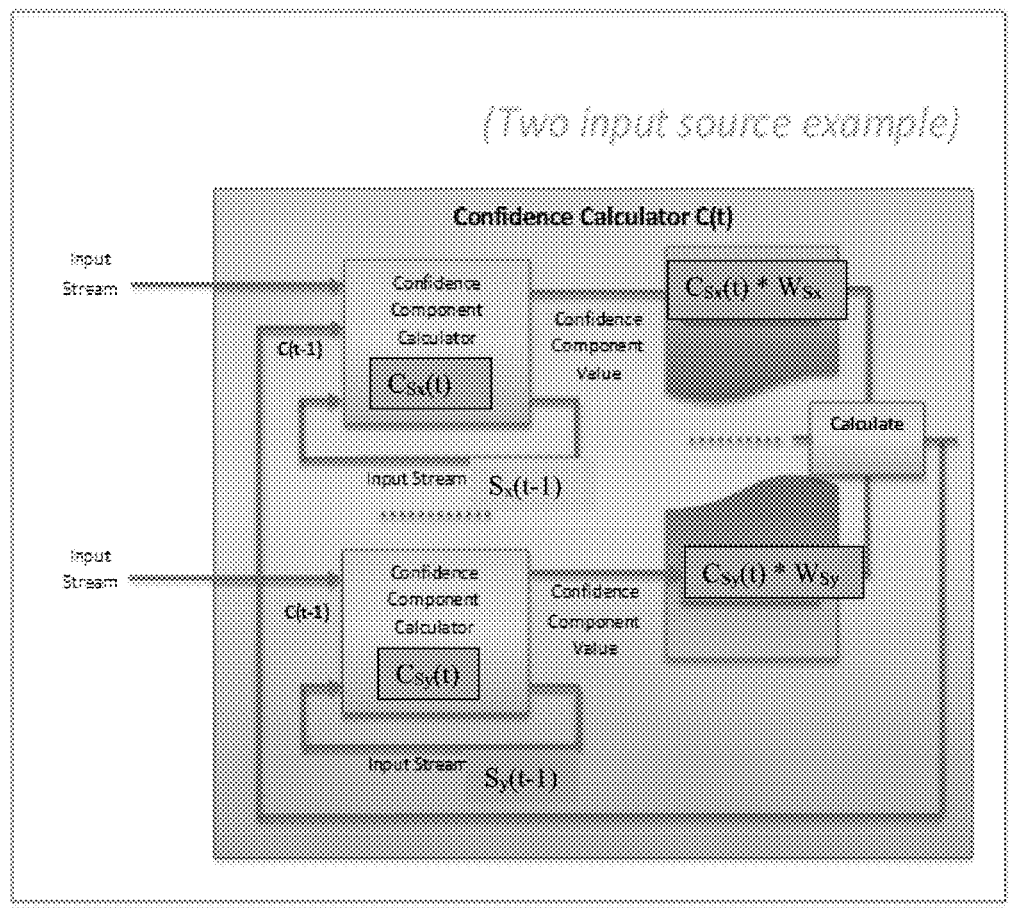
FIG. 1D is a diagram depicting two input source data streams provided as input to a passive authentication system, according to an example embodiment.

FIG. 1D is a diagram depicting two input source data streams provided as input to a passive authentication system, according to an example embodiment. The FIG. 1D is shown in simplified form with just those components necessary to understanding various embodiments being presented.

The FIG. 1D illustrates a finer-grain view into the confidence calculation process and shows a conceptual view of how each input stream can further contribute a confidence component of its own to the overall calculation. The FIG. 1D illustrates two sample confidence component calculation processes that are fed an input source, historical input data and historical confidence values. These component calculations then generate a new component confidence value, which is fed into an aggregation process where all the confidence input values are aggregated, analyzed and a final confidence value (single scalar confidence authentication value) is provided. The Wx variables are coefficients that can be used to adjust the weight of each input's contribution to the overall score.

The FIG. 1D system processing also considers composite input calculators. Correlations between different inputs might yield more insight and a stronger confidence component because of synergies when looking at two or more input streams.

The confidence calculator includes two separate sub confidence component calculators (first stage functions), each first stage function configured to handle a particular type of input stream data. Each input stream data associated with a different source that provides that input stream. It is noted that although only two input streams are shown, the techniques shown herein are not so limited. That is, the confidence calculator can be input source/stream agnostic allowing for a heterogeneous assortment of input streams (discrete, continuous, time-varying, scalars, vectors, etc.). Each desired input stream type can be added as a configured first stage function to a confidence calculator to normalize a particular input stream type. Each individual first stage function is also configured to decide how to transform (aggregate, weight, and compute) its input stream into a single component stream aggregated value. The component input stream-specific values are provided to a second stage function to calculate a single outputted value for a given instance of a confidence calculator (as an authentication confidence value).

In an embodiment, the single-input stream is represented as a vector of information representing geographical positioning information (three-dimensional (longitude (x), latitude (y), and altitude (z)) at a given time (t). An instance of the confidence calculator samples the current location from a mobile device or wearable device equipped with a Global Positioning Satellite (GPS) system. In the example case, the confidence calculator just uses this single input stream, which is a time-based series of three-dimensional vectors providing a user's device current location on earth.

The values from the vectors being captured, at predefined intervals of time, are stored by the first stage function of the confidence calculator in a frequency map and a confidence component value is generated, by the first stage function, by multiplying the calculated frequency (which includes the total frequency for values within a certain range of the point) by a coefficient applicable to the region the current location is in. This coefficient map (two-dimensional (2D) for each of illustration) provides a higher confidence coefficient for the user's home location and work location. Thus, the coefficient is a weight provided on the input stream (geographical location) based on a frequency with which the user was at particular geographical locations for extended periods of time (such as home and work).

It is noted that electronic, secure, non-interactive authentication mechanisms have been around for a long time in various industries. Although the level of sophistication required may vary, the goal is to secure and simplify (and possibly eliminate!) the human involvement. The techniques presented herein of leveraging connected mobile and wearable device sensor and activity input streams for generating multiple confidence components that can be aggregated into a single scalar confidence value provides a framework from which to build and evolve continuous authentication on devices.

Furthermore, the techniques herein provide mechanism for solving continuous and non-intrusive passive authentication on a connected device, which opens the door to even more possibilities for seamless user-environment interactions. In the new Internet of Things, users and enterprises can take advantage of their devices' inherent interoperability with systems all around us along with our continuous passive authentication mechanism to pay for groceries, pump gas, go to a theater, board a plane, conduct a banking transaction, and check into a hotel without ever having to take our phone out of our pocket. Some example embodiments of using the passive authentication system and techniques presented herein are now discussed with reference to the FIGS. 1E and 2-4.

Figure 1E:
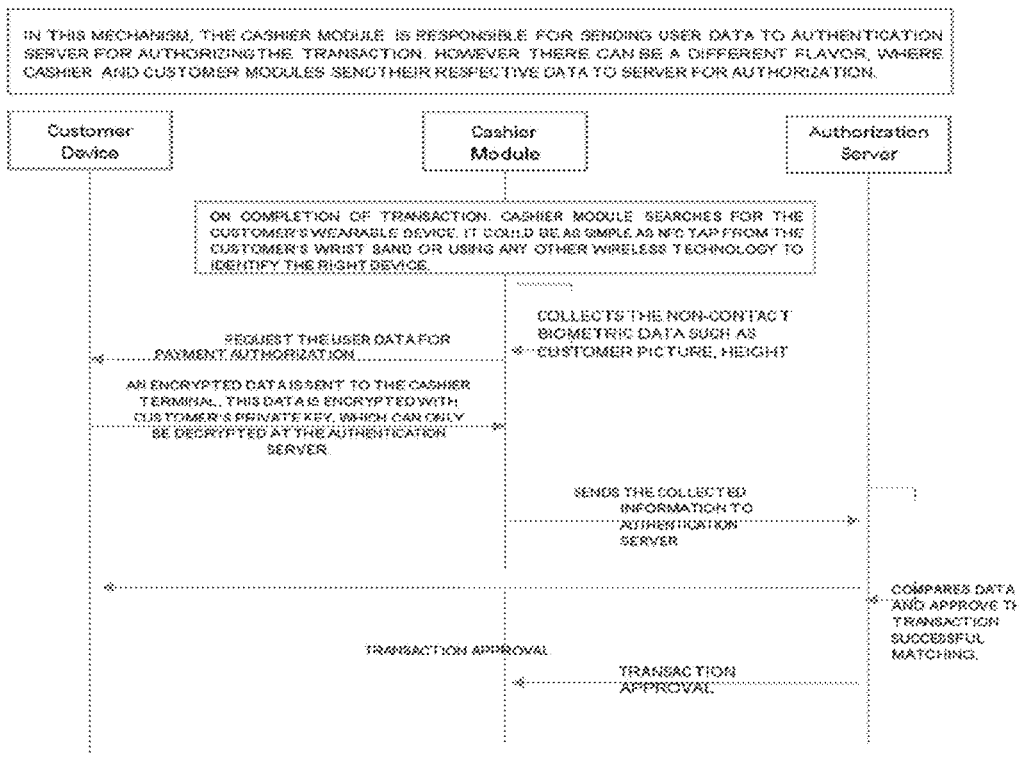
FIG. 1E is a diagram a method for processing passive authentication to perform payment processing at a Point-Of-Sale (POS) terminal, according to an example embodiment.

FIG. 1E is a diagram of a method for processing passive authentication to perform payment processing at a Point-Of-Sale (POS) terminal, according to an example embodiment. The method is programmed as executable instructions within memory and/or non-transitory computer-readable storage media and executed on one or more processors of one or more devices. The method is represented by one or more software modules referred to (for purposes of the discussion of the FIG. 1E) as a "passive payment authenticator." The passive payment authenticator has access to one or more networks, which can be wireless, wired, and/or a combination of wired and wireless.

The processing of the passive payment authenticator is discussed within the context of an example retail payment situation. It is noted that the passive payment authenticator can be used in many different environments and circumstances and that the present example is presented for purposes of illustration.

In a retail store, a consumer is able to use the passive payment authenticator to complete a payment transaction with full security and without even knowing that he/she is making the payment. The payment authenticator describes a seamless payment mechanism in which the consumer can pay for the goods without any conventional payment related processing.

The payment processor includes a MFA (Multi-Factor Authentication) approach to identify and passively authenticate the customer. The MFA approach requires the presentation of two or more of the three authentication factors: a knowledge factor ("something only the user knows"), a possession factor ("something only the user has"), and an inherence factor ("something only the user is"). After presentation, each factor is validated by the other party for passive authentication to occur.

A consumer operates/possess a mobile device or a wearable processing device having: wireless communication capabilities, which include: Near Field Communication (NFC) support, Bluetooth® support, WiFi support, and/or other wireless-enabled technologies.

A cashier at a retailer operates a POS terminal having: a non-contact biometric data capturing unit(s) (e.g., array of cameras for capturing different angles of facial data of the consumer while at the POS terminal, height sensors, etc.), a communication module that communicates with a mobile application on the consumer's mobile device/wearable, and wired and/or wireless communication capabilities to connect and communicate with an authentication server over a network connection.

The authentication server is configured with processing to: 1) compare consumer authentication data automatically obtained from the POS terminal against a consumer (customer) authentication template stored either on the server (or cloud environment) or on the consumer's mobile device/wearable and 2) approve a payment transaction for the consumer during a consumer transaction at the POS terminal when the consumer authentication data substantially matches (based on predefined threshold value or range of values) the authentication template.

Processing for a customer that performs a payment transaction at the POS terminal proceeds as follows. The cashier scans and/or enters product information for products being purchased by the customer at the POS terminal during a transaction. When the cashier performs an action to indicate that the last product was entered (such as hitting a total button on the POS terminal), the payment processor (processing on the POS terminal) begins a scan looking for the customer's mobile device/wearable. In an embodiment, a connection may necessitate the customer in tapping the mobile device/wearable against a NFC reader peripheral device integrated and/or interfaced to the POS terminal to establish the connection.

The payment processor then activates biometric-capable peripherals interfaced and/or integrated into the POS terminal. For example, the payment processor can activate a camera array and height sensors to obtain resource attribute data as customer face data, customer height data, and/or other customer body (biometric) data. These captured resource attributes are in the public domain meaning that the attributes are readily available without any action being required by the customer.

In an embodiment, the payment processor then sends a request to a mobile application executing on the customer's mobile device/wearable to provide the customer's biometric authentication template back to the payment processor on the POS terminal. The customer's biometric authentication template is acquired from the customer's mobile device/wearable in an encrypted format that can only be decrypted by the authentication server.

In an embodiment, the customer's biometric authentication template is not requested from the customer's mobile device/wearable because it is controlled and is accessible to the authentication server in network communication with the POS terminal and the payment processor.

In an embodiment, the payment processor makes a request that the mobile application executing on the mobile device/wearable provide the customer's biometric authentication template directly to the authentication server. In this embodiment, the payment processor never possesses the customer's biometric authentication template.

Next, the payment processor sends the resource attributes (automatically and unobtrusively obtained biometric data acquired by interactions between the payment processor and the biometric-capable sensors of the POS terminal) to the authentication server.

The authentication server compares the resource attributes against the customer's biometric authentication template and on a match initiates a payment transaction to conclude the customer's transaction with the POS terminal. The payment method can be defined in a customer profile (previously defined and registered by the customer and accessible to the authentication server based on successfully identifying the customer through a successful match of the resource attributes to the customer's biometric authentication template).

The authentication server (assuming success) sends a notification back to the payment processor that the transaction was approved and is concluded.

An example processing scenario for the payment processor is also presented in the FIG. 1E.

The payment processor provides automatic, customer transparent, and unobtrusive passive authentication for a customer during a POS transaction for payment processing, which can occur without any affirmative action being required by the customer. This can increase transaction throughput processing time at the POS terminal and provides a variety of security benefits, such as: 1) MFA where two or more independent automated parties are involved (customer mobile device/wearable, POS terminal, and authentication server); 2) if the customer's mobile device/wearable is lost or stolen, the device cannot be used for passive payment authentication processing because the dynamically acquired biometric data will not match the individual having the device; 3) any attempt by a thief to trick the dynamic biometric data gather (such as through a facial mask) can be caught during auditing procedures and will most likely involve an inside job requiring participation by the cashier to pull it off; 4) the processing is more secure than conventional payment processing requiring manual participation by the user and/or cashier; and 5) eliminates card skimming completely, since no card information is ever exposed on a network wire between from the customer mobile device/wearable and POS terminal (in fact the POS terminal may never actually possess any card information for the customer during the entirety of the transaction).

The payment processor demonstrates a secure MFA that automatically and passively performs authentication for payment processing at a POS terminal to conclude a customer transaction with payment.

So, the passive authentication techniques and systems discussed herein can include MFA and can be even more secure than conventional approaches to authentication within the industry.

Figure 2:
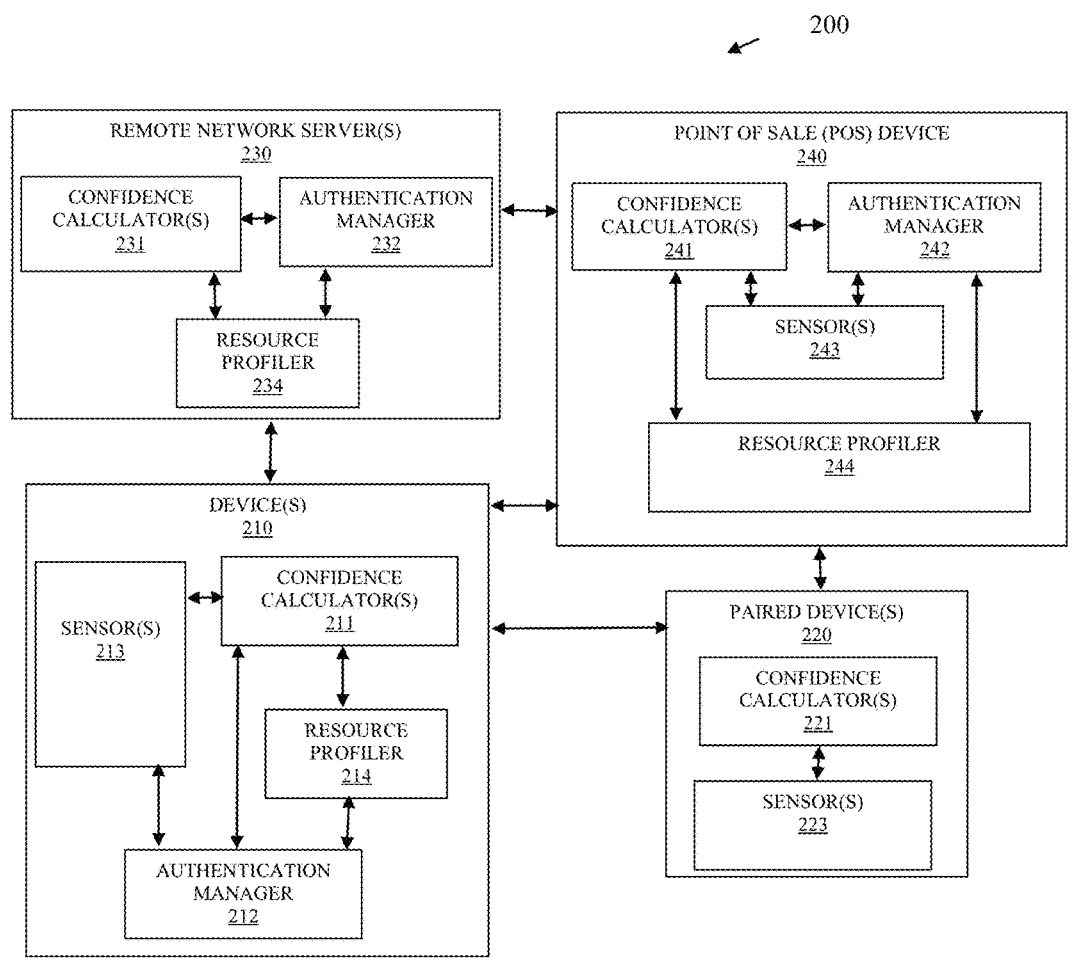
FIG. 2 is a diagram illustrating another system for passive authentication, according to an example embodiment.

FIG. 2 is a diagram illustrating another system 200 for passive authentication, according to an example embodiment. The system 200 is shown in greatly simplified form for illustrating just those components necessary for appreciating the passive authentication architecture and processing discussed herein.

The system 200 includes a device 210 having a confidence calculator 211, an authentication manager 212, one or more sensors 213, and resource profiler 214. Optionally, the system 200 includes a paired/interfaced device 220 having a confidence calculator 221 and one or more sensors 223. The system 200 further, optionally, includes a remote network server 230 having a confidence calculator 231, an authentication manager 232, and a resource profiler 234. Still further, the system 200 includes a POS device/terminal 240 having a confidence calculator 241, an authentication manager 242, one or more sensors 243, and a resource profiler 244.

It is to be noted that the confidence calculators 211, 221, 231, and 241 are each different configured instances of a same processing module, such that discussion of one of these applies to the others as well within their devices 210, 220, 230, and 240, respectively. This is also true for the authentication managers 212, 232, and 242; true for the sensors 213, 223, and 243; and true for the resource profilers 214, 234, and 244.

It is also noted that in some embodiments, the processing associated with the authentication managers 212, 232, and 242 may subsumed with the processing associated with the resource profilers 214, 234, and 244.

In fact, any given configuration of the system 200 may omit some modules on some devices; in this manner, the configuration for the system 200 is presented as one example configuration for illustration and other embodiments for passive authentication can include other configurations from that which is presented in the FIG. 2.

In an embodiment, the device 210 is mobile phone.
In an embodiment, the device 210 is a tablet.
In an embodiment, the device 210 is a laptop.
In an embodiment, the device 210 is an appliance.
In an embodiment, the device 210 is a desktop computer.
In an embodiment, the device 210 is a wearable processing device.
In an embodiment, the device 210 is a Self-Service Terminal (SST).
In an embodiment, the device 210 is a kiosk.
In an embodiment, the device 210 is a vehicle.
In an embodiment, the device 210 is an ATM.
In an embodiment, the device 210 is a Point-Of-Sale (POS) terminal.
In an embodiment, the device 210 is an attachable device that can be attached to an apparatus or another device.

The device 210 includes one or more processors, memory, and non-transitory computer-readable storage media. The device 210 is operated by a user and includes a variety of resources: software, hardware, and data assets, and, perhaps, integrated peripheral devices (e.g., value media dispenser and/or acceptor, card reader, scanner, receipt printer, touch screen, keyboard, encrypted PINpad, and others).

The confidence calculator 211 is implemented as one or more software modules as executable instructions that are programmed in the firmware, dedicated secure processor, general purpose memory and/or non-transitory computer-readable storage media of the device 210. The device's processors are configured to execute the confidence calculator 211. In an embodiment, the confidence calculator 211 is initiated and loaded for processing within the device 210 when the device 210 is booted or powered on.

The confidence calculator 211 is configured to execute in a transparent and unobtrusive manner so that the user can continue to operate the device without an indication of the processing being performed by the confidence calculator 211.

The frequency with which the confidence calculator 211 performs iterations to gather input streams and produce a confidence value is configurable. However, when an event is detected requiring authentication of the user, such as when: the user unlocks a screen rendered on a display of the device 210, powers the device 210 on, attempts to access a specific resource requiring additional authentication, attempts to checkout at the POS device 240 for a transaction, and the like, the confidence calculator 211 provides access to continuously computed single scalar confidence values over time using input streams and techniques described above with the description of the FIGS. 1A-1D.

In an embodiment, the processing of the confidence calculator 211 requests and uses confidence values supplied by one or more of: a confidence calculator 221 of a paired/connected device 220 (wearable 220) and/or a confidence calculator 231 of a remote network server 230.

In an embodiment, the processing of the confidence calculator 221 uses input streams requested from and provided by the paired/connected device 220 and/or the remote network server 230.

Moreover, additional processing associated with the confidence calculators 211, 221, 231, and 241 where discussed in the provisional filing that was incorporated by reference herein in its entirety.

The input streams of data that the confidence calculator 211 processes are provided by the sensors 213.

In an embodiment, a sensor 213 is a Global Positioning Satellite (GPS) receiver.
In an embodiment, a sensor 213 is an accelerometer.
In an embodiment, a sensor 213 is a gyroscope.
In an embodiment, a sensor 213 is a thermometer.
In an embodiment, a sensor 213 is a barometer.
In an embodiment, a sensor 213 is a scanner.
In an embodiment, a sensor 213 is a camera (front and/or read facing camera or an array of cameras).
In an embodiment, a sensor 213 is a microphone.
In an embodiment, a sensor 213 is a fingerprint scanner.
In an embodiment, a sensor 213 is a touch screen.
In an embodiment, a sensor 213 is a smell sensor.
In an embodiment, a sensor 213 is a motion sensor.
In an embodiment, a sensor 213 is an infrared sensor.
In an embodiment, a sensor 213 is a Human Input Device (HID).

The input streams of data are not affirmatively provided by or manually inputted (through a Human Input Device (HID) of the device 210) by the user. That is, the confidence calculator 211 uses independent and objective data dynamically acquired at a time it is needed for authentication without any affirmative and manual assistance being request of the user. The confidence calculator cooperates with the authentication manager 212 to continuously (at regular predefined intervals of time or at event-drive periods) passively authenticate the user for access to the device 210 or a resource of the device 210.

The output of the confidence calculator 211 is a scalar confidence value that can be used alone or in combination with other scalar confidence values to make an automated passive authentication determination for an operator of the device 210 at a given point in time. This is done through the authentication manager 212. In an embodiment, the automated passive authentication determination is outsourced by the authentication manager 212 to either the authentication manager 232 or the authentication manager 242.

It is to be noted that the phrase "operator of the device 210" means that a user either knowingly or unknowingly operates the device. By "knowingly" it is meant that the user actively operates the device 210 (such as a user's mobile phone) and is aware that the user is performing some action on the device 210. By "unknowingly" it is meant that the user interacts with an apparatus or another device to which the device 210 is integrated or interfaced to and the user is unaware of the fact that the user is actually operating the device 210. "Unknowingly" may also mean that the user is not directly interacting with a resource of the device 210, but is performing normal physical activities that activate resource profiler 214, such that the user is unaware of actually interacting with the device 210 but the user is in fact "unknowingly" interacting with the device 210.

It is noted that the authentication manager 212 may send the request that triggers the confidence calculator 211 to provide the currently calculated confidence value as well.

The authentication manager 212 is preconfigured with authentication values, ranges of values, thresholds, and/or policy conditions that when compared against the single confidence value makes a decision as to whether to authenticate the user for access to the device 210 or as to whether to authenticate the user for access to a specific resource or specific set of resources accessible from the device 210.

In an embodiment, the passive authentication performed is to determine whether to grant the user access to the paired/connected device 220.

In an embodiment, the passive authentication performed is to determine whether the paired/connected device 220 is to be permitted to pair or connect to the device 210.

In an embodiment, the passive authentication includes a confidence calculator 231 running on a remote network server 230.

In an embodiment, the passive authentication performed is to determine whether the remote network server 230 is permitted to connect to the device 210.

In an embodiment, the device 210 interacts with multiple paired devices 220 and multiple remote network servers 230.

The input streams fed as input to the confidence calculator 211 are continuously collected at predefined time intervals or upon detection of an event. The input streams include one or more of: audio samples gathered from a microphone of the device 210, images and/or video samples gathered from a camera of the device 210, geographical positioning information gathered from a GPS system of the device 210, biometric samples gathered from biometric sensors of the device 210, usage metrics for resources on the device 210 and gathers from logs resident on the device 210 or remotely accessible over a network connection from the device 210, and others.

The input streams are then weighted by the confidence calculator 211 using information relevant to one or more of: frequency maps, logs, history files, execution environment type for the confidence calculator 211, resource attributes, interconnection type used between the device 210 and the paired/connected device 220, interconnection type used between the device 210 and the remote network server 230, location of the confidence calculators (211, 221, 231) being used (on device 210, local off device 220, remotely off device over network 230), and others.

The input streams are processed through their respective confidence calculators: on device 211, on paired device 221, and remote server hosted 231, with the normalized confidence components then weighted and aggregated into the single confidence value provided to the authentication manager 212 for resolving whether to authenticate the user and/or whether to authentication the user with a defined security role having certain permissions with respect to resources of the device 210.

The resource profiler 214 collects data (resource attributes) relevant to a resource: a software resource (composite resource, system, application, OS, etc.) and a hardware resource (sensor 213, peripheral, processor, memory, etc.). The types of resource attributes collected from resources or about resources were discussed at length above with reference to the FIGS. 1A-1E. In an embodiment, the resource profiler 214 also collects data from the sensors 213, 223, and/or 243 (from paired device 220). In an embodiment, the resource profiler 214 collects data from software resources, such as a processing environment, platform, OS, application, and the like. In an embodiment, the resource profiler 214 collects data for a variety of different resources associated with multiple devices 210, 220, 230, and/or 240.

During operation, each of the resource profilers 214, 234, and 144 collect data (resource attributes) while a user is knowingly or unknowingly operating the device 210.

In an embodiment, the resource profilers 214, 234, and/or 244 collect the data for an interval or time as a grouping of data over that interval of time. The interval of time can be automatically determined by the resource profilers 214, 234, and/or 244 based on predefined starting and ending events. For example, a starting event can be defined as detection that the user is initiating an interaction with a resource to which the device 210, 230 (server), and/or 240 (POS device) is associated with and an ending event can be defined as detection that the device 210 is in wireless communication with the server 230 and/or POS device 240. It is noted that a variety of predefined starting and ending events can be predefined for automatically triggering the resource profilers 214, 234, and/or 244 to begin collect data and end collection of data.

In an embodiment, the resource profiler 214 receives an event notification or detects an event notification when the user accesses a music listening application or selection on the device 210. Metadata associated with the notification is also obtained by the resource profiler 214; the metadata can include, by way of example only: time of day, day of week, calendar day, music selection made, genre associated with music selection, music application identifier (resource identifier where the music application is a software resource), whether the entire music selection was played or exited before completion, and the like. The resource attributes (including the metadata) are used to assemble a profile and are used at any given point in time as input to the confidence calculators 211, 221, 231, and/or 241 to produce a single confidence value for passive authentication that is passed to authentication managers 212, 232, and/or 242 to make an authentication determination with respect to the user having the device 210 at any given point in time.

According to an embodiment, the communication contacts and communication applications of a user that reside and execute on device 210 are resources for which resource attributes are continuously acquired by the resource profiler 214. These communication applications can include, social media applications (Twitter®, Facebook®, LinkedIn®, Instagram®, Snapchat®, etc.), text messaging applications, and/or voice applications. The resource attributes provided data relevant to: resource identifier, time of day, day of week, length of resource activity for a given communication (length in time and/or text provided by the user), contact identifiers for contacts to which a communication is being made by the user, an indication as to whether the contact identifiers are included in known contact lists of the user, resource type (phone, social, text, etc.), location of the device (e.g., checkout lane at a retailer, home, work, traveling, etc.), and the like. A pattern or profile for communication can be maintained by the resource profiler 214 or by resource profilers 234 and/or 244 (and received from resource profiler 214 at predefined intervals or upon detection of an event (such as user in checkout lane for a POS terminal 240)). The resource attributes and the communication pattern or profile can be used as factors into the confidence calculators 211, 221, 231, and/or 241 for purposes of passively authenticating the user at any given point in time using the authentication managers 212, 232, and/or 242.

In an embodiment, the resource profiler 242 records resource attributes for a user when the user operates the POS terminal 240 (here, the POS terminal 240 is a SST 240). The resource attributes can include, but are not limited to one or more of: 1) the manner (rate, pressure, selection of a particular item when another is equivalently available for selection to achieve a same user action, etc.) in which the user accesses interface options/buttons associated with a HID of the SST 240; 2) the time spent at the SST 240; 3) any cashier-assistance needed by the user while operating the SST 240; 4) items purchased by the user during a transaction with the SST 240; 5) day of week calendar day of user interaction 6) right handed or left handed access; 7) movement when scanning or weighing the items at the SST 240; 8) number of bags used during the transaction 9) whether the user uses his/her own reusable bags during the transaction; 10) video analyzed movements of the user while conducting the transaction at the SST 240; 11) number of items dropped when handled by the user during the transaction, and/or others. The resource profiler 244 maintains a profile or pattern for the user (perhaps with resource profiler 234 of the server 230) and during any current interaction by the user at the SST 240, the resource attributes are fed to the confidence calculators 241 and/or 231 to produce the single confidence scalar value that is fed to the authentication managers 242 and/or 232 for purposes of passively authenticating the user for the transaction at the SST 240. This provides a number of benefits, such as automatically associating a customer loyalty number to the transaction without customer input, automatically configuring the SST 240 interface to preferences registered by the user/customer, automatically providing customer-registered payment methods to conclude the transaction, automatically providing customer-specific marketing promotions and the like.

In another embodiment, the device 210 is a mobile phone or wearable device of a cashier at a retail establishment. The cashier operating at the retail establishment the POS device 240 and the POS device 240 requiring cashier authentication for access to the POS device 240 to conduct transactions with a customer and/or to perform administrative operations on the POS device 240. The authentication manager 242 cooperates and has a trusted relationship and secure connection with the authentication manager 232 of the remote server 230. Moreover, the authentication manager 242 connects and interacts with the authentication manager 212 of the cashier's mobile 210 (which can be in a pocket of sitting in proximity to the POS device 240). The authentication manager 212 continuously and regularly requests a secure token from the authentication manager 242 for purposes of permitting the cashier to access a resource (POS application) executing on the POS terminal 240. The secure token includes a time stamp, cashier identity information/account identifier, and other credentials that the POS resource needs to properly authenticate the cashier for access to the POS resource. In an embodiment, the secure token is also signed with a private key of the POS terminal 240. The time stamp providing a "time-to-live" mechanism for the secure token, such that when a predefined elapsed period of time beginning with the time stamp of the secure token expires, the secure token is invalid and not capable of providing the cashier authenticated access to the POS resource. Any number of resource attributes can be continuously gathered by the resource profiler 214 and fed to authentication manager 232 (server) through the authentication manager 242 of the POS terminal 240. The authentication manager 232 provides an indication to the authentication manager 242 as to whether authentication was achieved and when it is achieved, the authentication manager 242 provides a secure token to authentication manager 212. When the cashier attempts to access the POS resource, the authentication manager 212 supplies the current secure token back to the POS resource for access. The secure token is updated automatically when the predefined period of elapsed time passes from a current time stamp associated with the secure token through interactions between the authentication managers 212, 232, and 242. This approach permits cashiers to avoid manual authentication procedures to operate POS terminals of a retail establishment and provides a secure passive authentication mechanism for ensuring security.

Some of embodiments of the FIGS. 1A-1E and the FIG. 2 and other embodiments are now discussed with reference to the FIGS. 3-5.

Figure 3:
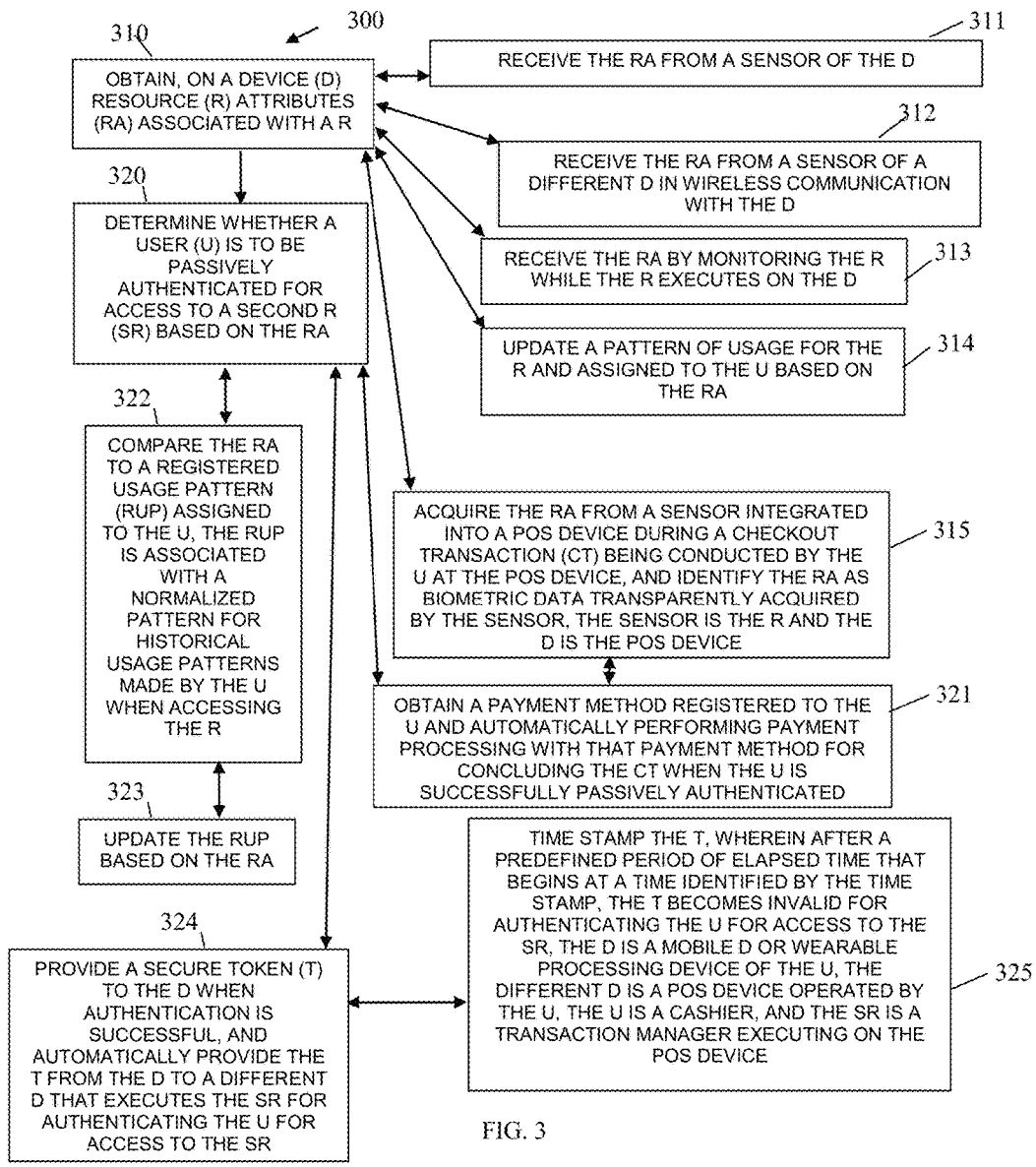
FIG. 3 is a diagram of a method for passive authentication, according to an example embodiment.

FIG. 3 is a diagram of a method 300 for passive authentication, according to an example embodiment. The software module(s) that implements the method 300 is referred to as a "passive authenticator." The passive authenticator is implemented as executable instructions programmed and residing within secure memory and/or a non-transitory computer-readable (processor-readable) storage medium and executed by one or more processors of a device. The processor(s) of the device that executes the passive authenticator are specifically configured and programmed to process the passive authenticator. The passive authenticator has access to one or more network connections during its processing. The network connections can be wired, wireless, or a combination of wired and wireless.

In an embodiment, the device that executes the passive authenticator is a POS terminal.

In an embodiment, the device that executes passive authenticator is a Self-Service Terminal (SST).

In an embodiment, the device that executes the passive authenticator is a kiosk.

In an embodiment, the device that executes the passive authenticator is an Automated Teller Machine (ATM).

In an embodiment, the device that executes the passive authenticator is a cashier-assisted terminal.

In an embodiment, the device that executes the passive authenticator is a mobile phone.

In an embodiment, the device that executes the passive authenticator is a tablet.

In an embodiment, the device that executes the passive authenticator is wearable processing device.

In an embodiment, the device that executes the passive authenticator is a vehicle.

In an embodiment, the device that executes the passive authenticator is an attachable device that is attached to an apparatus and/or another different device.

In an embodiment, the device that executes the passive authenticator is a laptop.

In an embodiment, the device that executes the passive authenticator is a desktop computer.

In an embodiment, the device that executes the passive authenticator is an appliance.

In an embodiment, the passive authenticator is the processing described in the FIGS. 1A-1E.

In an embodiment, the passive authenticator is one or more of the software modules discussed above with reference to the system 200 of the FIG. 2.

At 310, the passive authenticator obtains resource attributes associated with a resource. In some manner, a user is either knowingly or unknowingly interacting with the resource (as discussed above). The resource attributes (types and information) and the resources were discussed above. The resource attributes can be obtained in a variety of manners.

For example, at 311, the passive authenticator receives the resource attributes from one or more sensors associated with the device. A list of sensors and sensor data was presented above.

In an embodiment, at 312, the passive authenticator receives the resource attributes from one or more sensors of a different device in wireless communication with the device. This can be a wearable processing device, such as wearable 220 of the system 200 discussed in the FIG. 2 above.

In an embodiment, at 313, the passive authenticator receives the resource attributes by actively monitoring the resource while the resource executes on the device. Here, the resource is a software resource or a composite resource that is a collection of resources (OS, platform, system, etc.). The resource attributes can include or be augmented with a variety of metadata as well, such as time of day, day of week, resource identifier, and the like (also discussed above).

In an embodiment, at 314, the passive authenticator updates a pattern of usage for the resource, the pattern of usage assigned to the user based on the resource attributes. In an embodiment, the pattern is a biometric template for the user (as discussed above).

According to an embodiment, at 315, the passive authenticator acquires the resource attributes from a sensor that is integrated into a POS device during a checkout transaction being conducted by the user at the POS device. The passive authenticator also identifies the resource attributes as biometric data that is transparently acquired by the sensor and the sensor is the resource and the device is the POS device.

At 320, the passive authenticator determines whether the user is to be passively authenticated for access to a second resource based on the resource attributes. The second resource can also be a hardware asset (device or device component) and/or a software resource. Moreover, the second resource can be a composite resource that is a collection or set of resources, and the collection can include a mixture of hardware and software resources or the collection can include all of one type of resource (just hardware or just software).

In an embodiment of 320 and 315, at 321, the passive authenticator obtains a payment method registered to the user. The passive authenticator also automatically performs payment processing with the payment method for concluding the checkout transaction when the user is successfully passively authenticated.

According to an embodiment, at 322, the passive authenticator compares the resource attributes to a registered usage pattern assigned to the user. The pattern is associated with a normalized pattern for historical usage patterns made by the user when accessing the resource.

In an embodiment of 322 and at 323, the passive authenticator updates the registered usage pattern based on the resource attributes. This creates a feedback loop to capture new emerging usage patterns of the user with respect to the resource.

In an embodiment, at 324, the passive authenticator provides a secure token to the device when the authentication is successful. The passive authenticator also automatically provides the secure token from the device to a different device that executes the second resource for authenticating the user for access to the second resource.

In an embodiment of 324 and at 325, the passive authenticator time stamps the token. After a predefined period of elapsed time (identified by the time stamp), the secure token becomes invalid for authenticating the user for access to the second resource. Here, the device is a mobile device or wearable processing device in possession of the user, the different device is a POS device operated by the user (who is a cashier), and the second resource is a transaction manager executing on the POS device.

Figure 4:
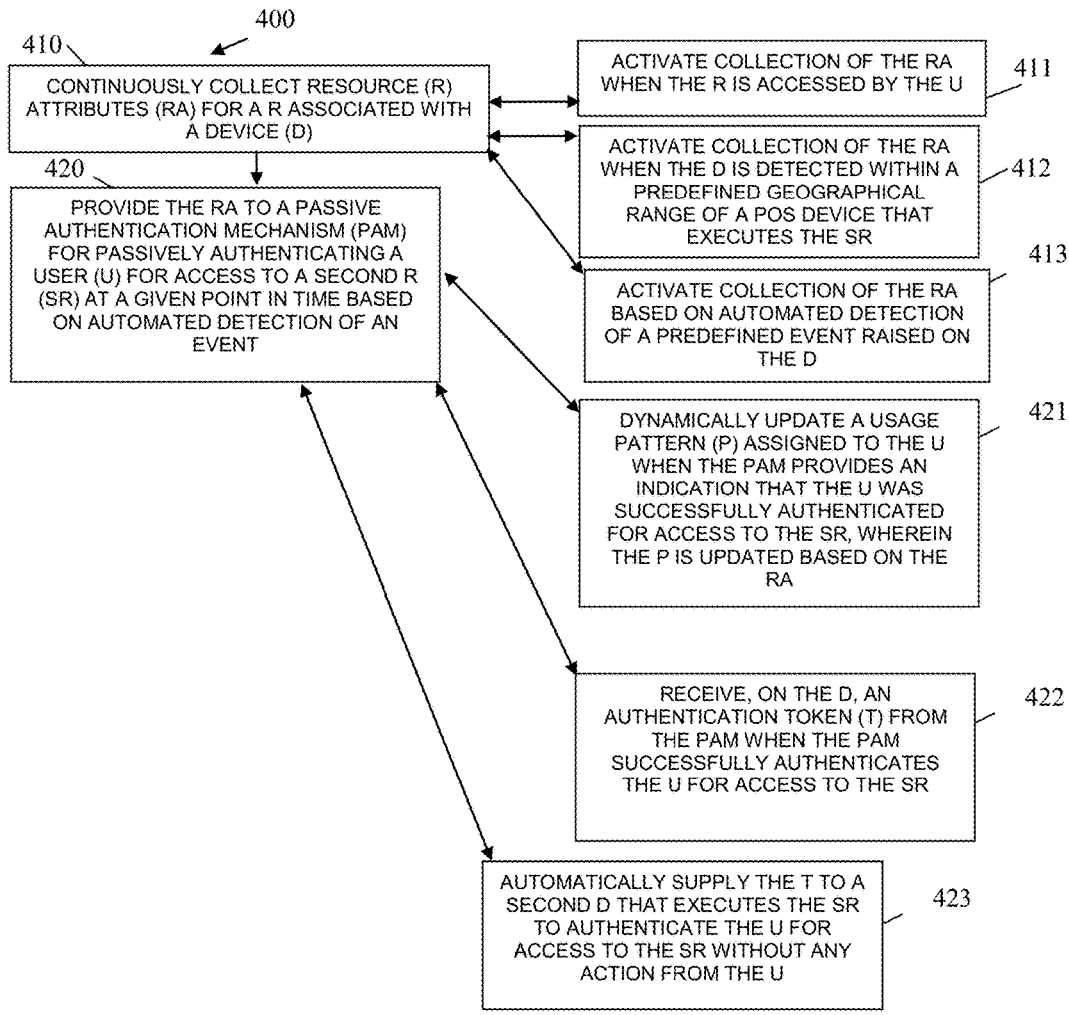
FIG. 4 is a diagram of another method for passive authentication, according to an example embodiment.

FIG. 4 is a diagram of another method 400 for passive authentication, according to an example embodiment. The software module(s) that implements the method 400 is referred to as a "resource profiler." The resource profiler is implemented as executable instructions programmed and residing within secure memory and/or a non-transitory computer-readable (processor-readable) storage medium and executed by one or more processors of a device. The processors that execute the resource profiler are specifically configured and programmed to process the resource profiler. The resource profiler has access to one or more network connections during its processing. The network connections can be wired, wireless, or a combination of wired and wireless.

In an embodiment, the device that executes the resource profiler is different from a second device that the resource profiler is providing authentication for. In an embodiment, the device is within a local networked environment of the second device. In an embodiment, the device is remotely located over a Wide-Area Network (WAN) from the device.

In an embodiment, the device that executes the resource profiler is a POS terminal.

In an embodiment, the device that executes resource profiler is a Self-Service Terminal (SST).

In an embodiment, the device that executes the resource profiler is a kiosk.

In an embodiment, the device that executes the resource profiler is an Automated Teller Machine (ATM).

In an embodiment, the device that executes the resource profiler is a cashier-assisted terminal.

In an embodiment, the device that executes the resource profiler is a mobile phone.

In an embodiment, the device that executes the resource profiler is a tablet.

In an embodiment, the device that executes the resource profiler is wearable processing device.

In an embodiment, the device that executes the resource profiler is a vehicle.

In an embodiment, the device that executes the resource profiler is a laptop.

In an embodiment, the device that executes the resource profiler is a desktop computer.

In an embodiment, the device that executes the resource profiler is an appliance.

In an embodiment, the resource profiler is the resource profiler 214 of the FIG. 2.

In an embodiment, the resource profiler is the resource profiler 234 of the FIG. 2.

In an embodiment, the resource profiler is the resource profiler 244 of the FIG. 2.

In an embodiment, the resource profiler is a combination of one or more of: the resource profiler 214, the resource profiler 234, the resource profiler 244, the authentication manager 212, the authentication manager 232, and the authentication manager 242.

In an embodiment, the resource profiler is the method 300 of the FIG. 3.

At 410, the resource profiler continuously collects resource attributes associated with a resource of a device.

According to an embodiment, at 411, the resource profiler activates collection of the resource attributes when the resource is accessed by the user.

In an embodiment, at 412, the resource profiler activates collection of the resource attributes when the device is detected within a predefined geographical range of a POS device that executes the second resource.

In an embodiment, at 413, the resource profiler activates collection of the resource attributes based on automated detection of a predefined event raised on the device.

At 420, the resource profiler provides the resource attributes to a passive authentication mechanism for passively authenticating a user for access to a second resource at a given point in time based on automated detection of an event (that identifies a need for passive authentication).

In an embodiment, at 421, the resource profiler dynamically updates a usage pattern assigned to the user when the passive authentication mechanism provides an indication that the user was successfully authenticated for access to the second resource. The pattern is updated based on the resource attributes.

In an embodiment, at 422, the resource profiler receives, on the device, an authentication token from the passive authentication mechanism when the passive authentication mechanism successfully authenticates the user for access to the second resource.

In an embodiment, at 423, the resource profiler automatically supplies the token to a second device that authenticates the user for access to the second resource without any action from the user.

Figure 5:
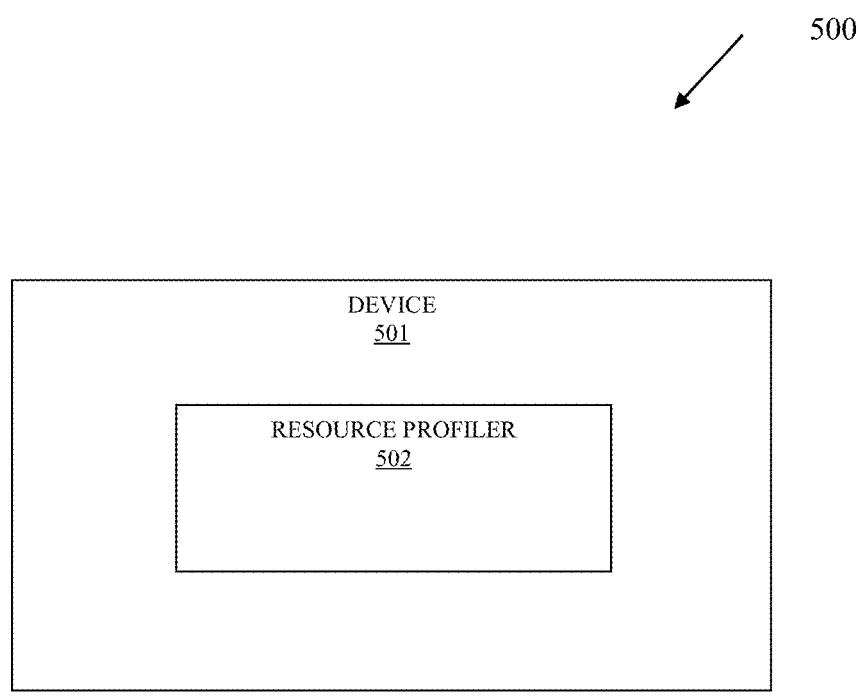
FIG. 5 is a diagram of a passive authentication system, according to an example embodiment.

FIG. 5 is a diagram of a passive authentication system 500, according to an example embodiment. The passive authentication system 500 includes a variety of hardware components and software components. The software components of the passive authentication system 500 are programmed and reside within secure memory and/or a non-transitory computer-readable medium and execute on one or more processors of the passive authentication system 500. The passive authentication system 500 communicates over one or more networks, which can be wired, wireless, or a combination of wired and wireless.

In an embodiment, the passive authentication system 500 implements, inter alia, the embodiments discussed above with reference to the FIGS. 1A-1E and 2-3.

In an embodiment, the passive authentication system 500 implements, inter alia, the system 200 of the FIG. 2.

In an embodiment, the passive authentication system 500 implements, inter alia, the method 300 of the FIG. 3.

In an embodiment, the passive authentication system 500 implements, inter alia, the method 400 of the FIG. 4.

In an embodiment, the passive authentication system 500 implements all and/or various combinations of the embodiments of the FIGS. 1A-1E, the system 200, the method 300, and the method 400.

The passive authentication system 500 includes a device 501 and a resource profiler 502.

In an embodiment, the device 501 is one of: a mobile phone, a wearable processing device, a tablet, a laptop, a computer desktop, a POS terminal, a SST, an ATM, an appliance, an attachable device attached to an apparatus and/or a different device from the device 501, and a vehicle.

The resource profiler 502 is configured to: execute on the device 501, continuously collect resource attributes for a resource, and provide the resource attributes to a passive authentication system to initiate passive authentication for access to a second resource.

In an embodiment, the passive authentication system is the system 200 of the FIG. 2.

In an embodiment, the second resource is a resource residing on POS device 240 of the FIG. 2

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
obtaining, on a device, resource attributes associated with a resource and obtaining settings for configuration options of the resource, wherein the settings change over time based on usage of the resource and the settings for the configuration options include:
device idle-time out setting,
device keyboard type,
device volume level,
device power saving mode,
device screen rotation, and
an indication whether a default setting permits installation of device applications outside of an application store; and
determining whether a user is to be passively authenticated for secure authenticated access to a second resource based on both the resource attributes and the settings, wherein the resource and the second resource include one or more of: a hardware asset, a software asset, and a grouping of the hardware and software assets, and wherein the resource attributes are measurable metrics automatically obtained for the resource by one or more of: a sensor and a software module, and wherein determining further includes providing a varying level of access to the second resource based on a calculated confidence value for the resource attributes.

2. The method of claim 1, wherein obtaining further includes receiving the resource attributes from the sensor of the device.

3. The method of claim 1, wherein obtaining further includes receiving the resource attributes from the sensor of a different device in wireless communication with the device.

4. The method of claim 1, wherein obtaining further includes receiving the resource attributes by monitoring the resource while the resource executes on the device.

5. The method of claim 1, wherein obtaining further includes updating a pattern of usage for the resource and assigned to the user based on the resource attributes.

6. The method of claim 1, wherein obtaining further includes acquiring the resource attributes from at least one sensor integrated into a Point-Of-Sale (POS) device during a checkout transaction being conducted by the user at the POS device, and identifying the resource attributes as biometric data transparently acquired by the at least one sensor, and wherein the at least one sensor is the resource and the device is the POS device.

7. The method of claim 6, wherein determining further includes obtaining a payment method registered to the user and automatically performing payment processing with that payment method for concluding the checkout transaction when the user is successfully passively authenticated.

8. The method of claim 1, wherein determining further includes comparing the resource attributes to a registered usage pattern assigned to the user, wherein the registered usage pattern is associated with a normalized pattern for historical usage patterns made by the user when accessing the resource.

9. The method of claim 8, wherein comparing further includes updating the registered usage pattern based on the resource attributes.

10. The method of claim 1, wherein determining further includes providing a secure token to the device when authentication is successful, and automatically providing the secure token from the device to a different device that executes the second resource for authenticating the user for access to the second resource.

11. The method of claim 10, wherein providing further includes time-stamping the secure token, wherein after a predefined period of elapsed time that begins at a time identified by the time stamping, the secure token becomes invalid for authenticating the user for access to the second resource, the device is a mobile device or wearable processing device of the user, the different device is a Point-Of-Sale (POS) device operated by the user, the user is a cashier, and the second resource is a transaction manager executing on the POS device.

* * * * *